United States Patent
Balas

[11] 3,815,512
[45] June 11, 1974

[54] ON DEMAND CAR WASH CONVEYOR APPARATUS
[75] Inventor: Adam Balas, Los Angeles, Calif.
[73] Assignee: The Allen Group Inc., Melville, Long Island, N.Y.
[22] Filed: Apr. 6, 1972
[21] Appl. No.: 241,738

[52] U.S. Cl. .............................. 104/172 B, 198/170
[51] Int. Cl. ............................................ B65g 17/24
[58] Field of Search.......... 104/172 B, 178; 198/170

[56] References Cited
UNITED STATES PATENTS
| | | | |
|---|---|---|---|
| 1,671,950 | 5/1928 | Necheff | 198/170 |
| 3,408,951 | 11/1968 | Heinicke et al. | 104/172 B |
| 3,568,606 | 3/1971 | Grant | 104/172 B |
| 3,677,190 | 7/1972 | Koch | 104/172 B |

Primary Examiner—M. Henson Wood, Jr.
Assistant Examiner—Robert Saifer
Attorney, Agent, or Firm—Fulwider Patton Rieber Lee & Utecht

[57] ABSTRACT

On demand car wash conveyor apparatus for installation in a tire path of a car to be washed and having a retraction trench extending therealong. The conveyor apparatus includes an endless chain extending along the tire path adjacent such trench and has a plurality of longitudinal mounting pin means spaced longitudinally therealong. A plurality of sets of first and second shafts are pivotally mounted on their respective one extremities from the respective pin means and are pivotable between an operative position projecting transversely over the tire path and a retracted position extending vertically into the retraction trench. A plurality of sets of pusher and support rollers are mounted from the respective first and second shafts and the pusher rollers are disposed above the level of the support rollers when the shafts are in their operative positions. Further, a plurality of strut means are pivotally connected on their respective one extremities with the respective pin means and project forwardly and outwardly therefrom to have their respective opposite extremities connected with the free ends of the respective first shafts to thereby provide support against the bending moment applied to such respective shafts when they are engaged behind the wheel of a car to be pushed through a car wash apparatus.

7 Claims, 6 Drawing Figures

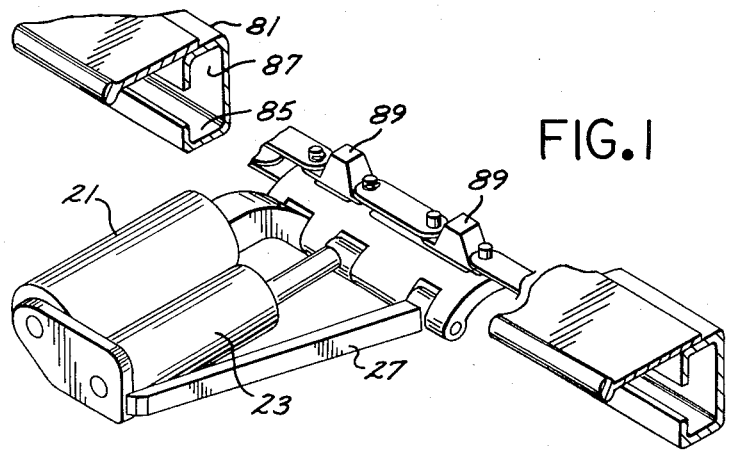
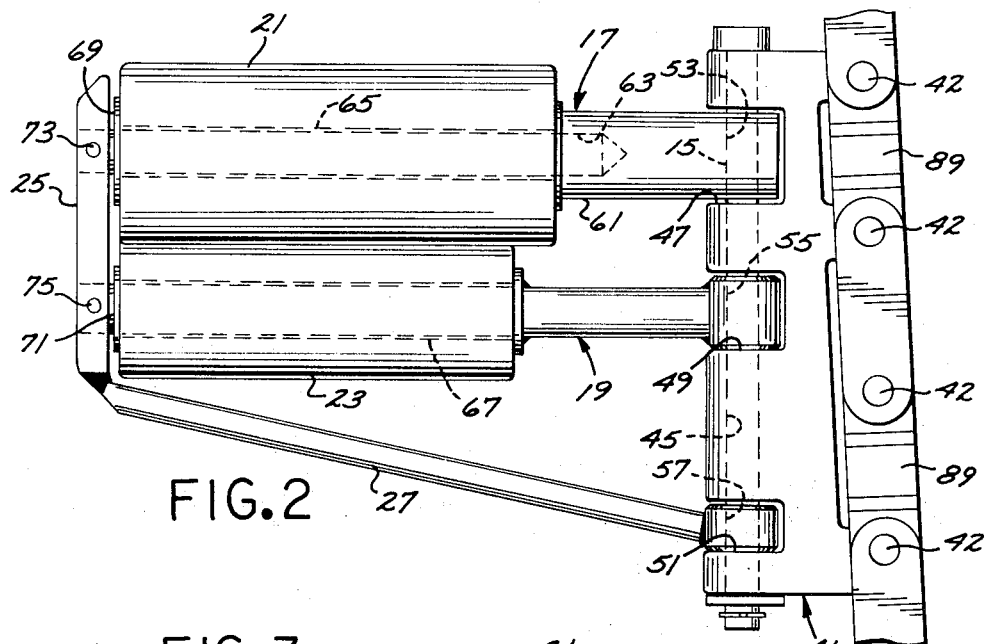
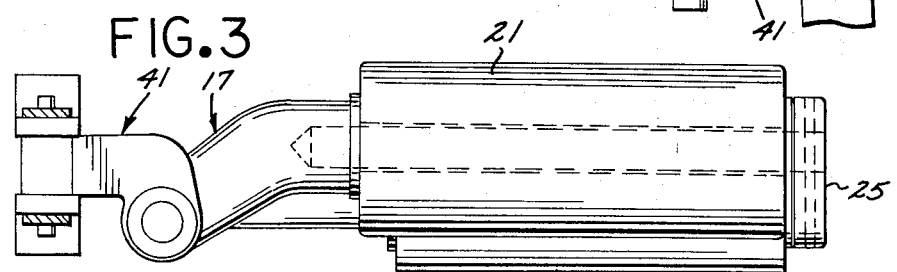
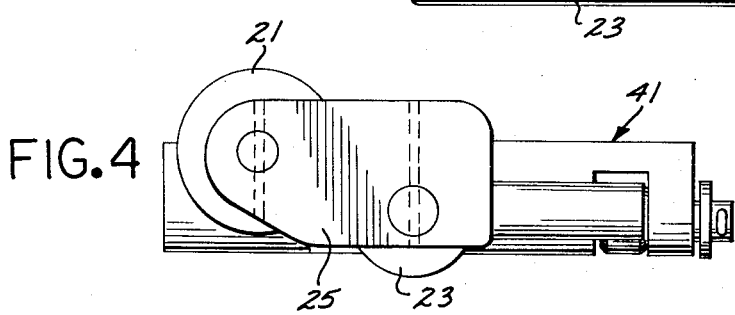

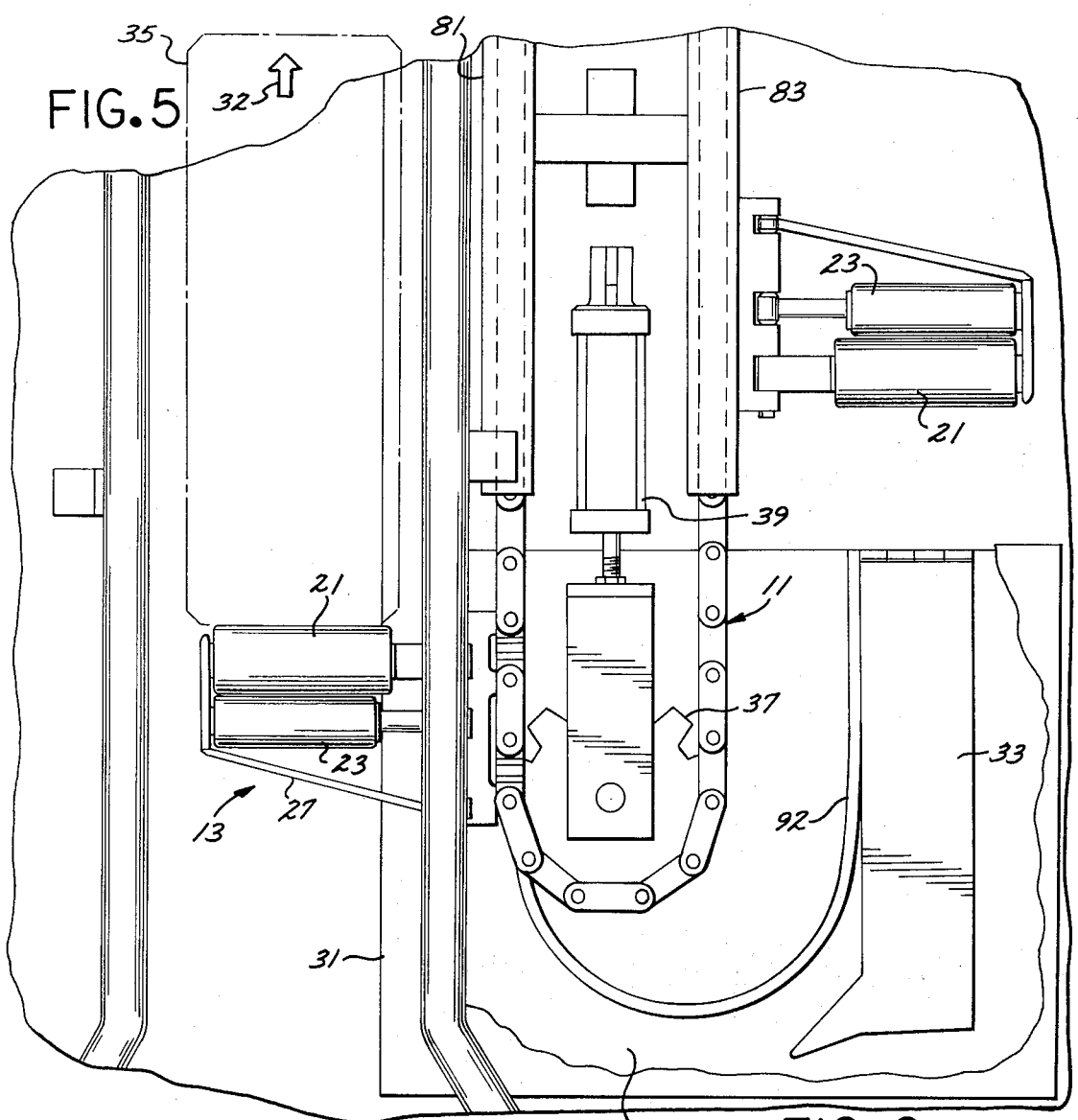
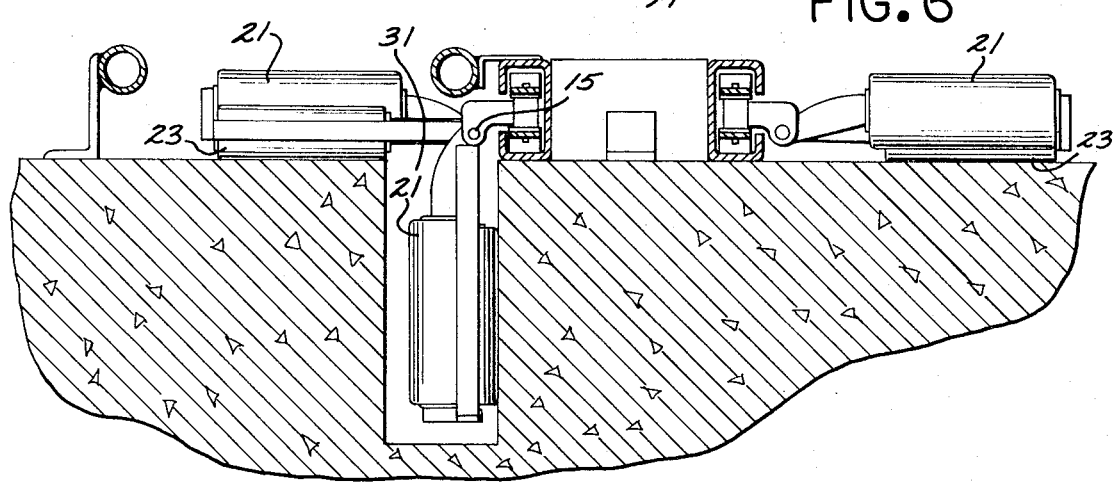

ON DEMAND CAR WASH CONVEYOR APPARATUS

BACKGROUND OF THE INVENTION

1. Field of the Invention

The present invention relates to a car wash conveyor of the type normally referred to as an "on demand" conveyor wherein the conveyor runs continuously and rollers are selectively brought into operative or retracted position depending on whether or not a car is present for being conveyed through a washing mechanism.

2. Description of the Prior Art

It has been common practice to provide "on demand" conveyors which include endless chains extending along the path of the car to be washed and which include rollers projecting transversely thereof for engagement behind wheels of cars to be washed. Conveyors of this type suffer the shortcoming that extremely high bending moments are applied to the rollers when they are engaged behind the wheel of a car thereby requiring that the mounting shafts therefor be of a relatively great cross section in order to withstand such bending moments.

SUMMARY OF THE INVENTION

The on demand conveyor apparatus of present invention is characterized by a plurality of sets of rollers projecting transversely from an endless conveyor chain extending along the path of the tire of a car to be washed and pivotable between a horizontal operative position and a vertical retracted position. Such rollers are braced at their respective outer extremities by strut means which angles inwardly behind such respective sets of rollers to pivotally connect with a mounting pin.

The objects and advantages of the present invention will become apparent from a consideration of the following detailed description when taken in conjunction with the accompanying drawings.

DESCRIPTION OF THE DRAWINGS

FIG. 1 is a partially broken away perspective view of a car wash conveyor apparatus embodying the present invention;

FIG. 2 is a plan view, in enlarged scale, of the car wash conveyor apparatus shown in FIG. 1;

FIG. 3 is a front view, in enlarged scale, of the car wash conveyor apparatus shown in FIG. 1;

FIG. 4 is a left end view, in enlarged scale, of the car wash conveyor apparatus shown in FIG. 1;

FIG. 5 is a plan view similar to FIG. 2 but in reduced scale to show a greater portion of the conveyor apparatus; and FIG. 6 is a vertical transverse sectional view taken through the car wash conveyor apparatus shown in FIG. 5.

DESCRIPTION OF THE PREFERRED EMBODIMENT

Referring to FIGS. 5 and 6, the on demand car wash conveyor apparatus of present invention includes, generally, an endless conveyor chain 11 extending along the tire path 13 of a car to be washed and having a plurality of longitudinal mounting pins 15 (FIG. 2) spaced longitudinally therealong. Carried pivotally on one extremity from the respective mounting pins 15 are a plurality of sets of pusher and support shafts, 17 and 19, respectively, which have respective pusher and support rollers 21 and 23 mounted thereon. A brace 25 connects the free extremities of the shafts 17 and 19 together and is, itself, connected on its rear extremity with a strut 27 which angles rearwardly and inwardly to be pivotally connected with the pins 15 on its inner extremity. Referring to FIG. 6, a retraction trench 31 extends along the tire path 13 on one side of the conveyor chain 11 and disposed on the opposite side of such conveyor chain is a trap door (FIG. 5) which normally supports the rollers 21 and 23 in their horizontal positions as such rollers are moved rearwardly therealong but is selectively lowerable to feed the free extremities of selected ones of the rollers 21 and 23 downwardly into the trench 31 to thereby retract such rollers into the trench. Thus, when an automobile is in position to be conveyed forwardly along the car path in the direction of the directional arrow 32 (FIG. 5), the trap door 33 will be left in its raised position and the demanded roller set will be conveyed rearwardly along the return side of the conveyor and be turned around and moved forwardly to be brought into position behind the car wheel 35 as shown in FIG. 5 to engage the pusher roller 21 with such wheel and commence forward movement thereof, it being realized that the consequent bending moment imposed on the roller shaft 17 is resisted, in part, by the rearwardly and inwardly angling strut 27.

The conveyor chain 11 is horizontally disposed and has its opposite extremities threaded around respective sprockets 37, the sprockets 37 shown in FIG. 5 being carried from a take-up mechanism 39. The chain 11 is formed by a plurality of chain links and incorporates a mounting bracket, generally designated 41, for each set of rollers 21 and 23. The mounting brackets 41 essentially span three chain links and form portions of those links to provide for articulation about chain pins 42 as the respective mounting brackets 41 travel around the respective sprockets 37.

The mounting brackets 41 include respective through longitudinal bores 45 for receipt of the respective mounting pins 15 and three transversely extending, outwardly opening slots 47, 49 and 51 are formed in such brackets 41 for receipt of the inner ends of the respective shafts 17 and 19 and inner ends of the strut 27. The extremities of the shafts 17 and 19 and strut 27 include respective radial bores 53, 55 and 57 for projection of the respective longitudinally disposed mounting pins 15. The pusher shafts 17 are each in the form of a boss 61 mounted from the pin 15 and having a threaded axial bore 63 formed in the outer extremity thereof for receipt of an axle 65 which projects through an axial bore formed in the pusher roller 21. The respective shafts 19 are formed with respective axle portions 67 which project through axial bores in the respective support rollers 23. Washers 69 and 71 are fitted on the outer extremities of the axles 65 and 67 and the brace 25 is secured to the outer extremities of such axles by means of pins 73 and 75.

Referring to FIGS. 1 and 5, the runs of the chain 11 feed through C-channel runners 81 and 83 which serve to form respective upwardly and downwardly opening grooves 85 and 87 (FIG. 1) that receive guide lugs 89 projecting from the respective mounting brackets 41 for maintaining the chain 11 in alignment with such runners 81. The trap door 33 is hinged on its forward end and has its free end connected with a fluid cylinder that is actuable to raise and lower such door. A retraction rail 92 wraps around the rearward end of the conveyor and projects in a somewhat spiral path leading rearwardly from ground level at the hinged end of the door 33 to extend downwardly into a pit 94 to wrap around the end of the conveyor and extend forwardly in such pit to lead to the retraction trench 31.

In operation the conveyor chain 11 is normally rotated continuously and when a car is brought into position with a tire on the path 13 for conveyance of such car through a car washing mechanism the trap door 33 is retained in its raised position to feed the oncoming rearwardly moving set of rollers 21 and 23 around the sprocket 37 and onto the tire path 13 to be carried forwardly and be engaged behind the car wheel 35 as shown in FIG. 5. It will be appreciated that the weight of the roller set is carried on the lower ground-engaging support roller 23 which rotates in the same direction as the wheel 35 while the elevated pusher roller 21 is free to counter-rotate with respect to the direction of rotation of the car wheel 35. As the pusher roller 21 initially contacts the stationary car wheel 35 a relatively high force is required to overcome the car momentum and such force is carried, in part, by the brace 25 and strut 27 to resist rearward bending of the pusher and support shafts 17 and 19, respectively. Continued rotation of the conveyor chain 11 pushes the car wheel 35 forwardly through the car wash mechanism and such roller set is then returned rearwardly along the return side of such conveyor chain.

When a car has not yet been brought into position in the car path 13, roller sets returning along the return side of such chain 11 may be retracted into the trench 31 by lowering the trap door 33 to enable the free ends of such rollers to feed downwardly along the downwardly angled retraction rail 92 to enable such roller sets to pivot about their respective mounting pins 15 to assume their downwardly extending vertical retracted position shown in FIG. 6. Consequently, the retracted roller sets will be retracted out of the tire path 13 to enable a car tire to subsequently be driven into position on such path without the necessity of running the car tire 35 over unloaded sets of rollers being conveyed along such path. After a subsequent car has been moved into position in the tire path 13 the trap door 33 may be again raised to its elevated position to feed the next oncoming roller set onto the tire path 13 for engaging behind the wheel of the car to be conveyed.

From the foregoing it will be apparent that the car wash conveyor apparatus of present invention provides an economical and convenient means for conveying cars continuously through a car wash mechanism while eliminating the inconvenience of running the tire of an oncoming car over unused rollers.

Various modifications and changes may be made with regard to the foregoing detailed description without departing from the spirit of the invention.

I claim:

1. On demand car wash conveyor apparatus for installation on a wheel path of a car to be washed and having a retraction trench extending therealong, said apparatus comprising:
    endless conveyor chain means for extending over said car path and including a drive run extending adjacent said trench;
    a plurality of mounting brackets spaced along said drive conveyor chain and each extending longitudinally along said run;
    longitudinally elongated pivot pins mounted from said mounting brackets;
    a plurality of sets of first and second shafts mounted on their respective one extremities to the lead ends of said respective pivot pins and pivotable between an operative position projecting horizontally over said wheel path and a retracted position having the free extremities thereof extending into said trench;
    a plurality of sets of pusher and support rollers mounted on said respective first and second shafts with said pusher rollers being disposed above said support rollers when said shafts are in said operative positions; and
    a plurality of strut means disposed behind said respective sets of shafts, connected on their respective one extremities with the respective rear trailing extremities of said respective pivot pins and projecting forwardly to connect on their respective opposite extremities with the free ends of said respective first shafts whereby said chain means may be rotated and said sets of rollers individually directed to said operative or retracted positions depending on the demand therefor and the sets of rollers in said operative position will be carried on said respective support rollers to engage said respective pusher rollers with car wheels disposed in said wheel path and said respective strut means will brace said free extremities of said respective first shafts as said respective car wheels are pushed forwardly by said respective pusher rollers.

2. On demand car wash conveyor apparatus as set forth in claim 1 that includes:
    channel means extending along said chain means and formed on one side with a retaining groove and wherein:
    said chain means includes a plurality of retaining lugs projecting into said retaining groove.

3. On demand car wash conveyor apparatus as set forth in claim 1 wherein:
    said respective strut means includes brace means connecting said free extremities of said respective sets of first and second shafts together.

4. On demand car wash conveyor apparatus as set forth in claim 3 that includes:
    channel means extending along said chain means and formed on one side with a retaining groove and wherein:
    said chain means includes a plurality of retaining lugs projecting into said retaining groove.

5. On demand car wash conveyor apparatus as set forth in claim 1 wherein:
    said mounting brackets are each formed with three slots spaced longitudinally therealong wherein:
    said mounting pins project through said slots; and
    said respective sets of shafts and strut means project on their said one extremities into said respective three slots of said respective brackets to pivotally connect with said respective pins.

6. On demand car wash conveyor apparatus as set forth in claim 5 that includes:
    channel means extending along said chain means and formed on one side with a retaining groove and wherein:

said chain means includes a plurality of retaining lugs projecting into said retaining groove.

7. In a car wash conveyor apparatus of the type including an endless conveyor chain means for extending along a car path for conveying a car along a horizontal surface, the improvement comprising:
- a plurality of mounting brackets spaced along said conveyor means and formed with respective sets of three slots spaced longitudinally therealong and opening outwardly away from said conveyor means;
- a plurality of pivot pins carried in said respective brackets, each projecting longitudinally through said respective sets of slots;
- a plurality of sets of first and second shafts projecting on their respective one extremities into the lead two slots of said respective sets and carried from said respective pivot pins;
- a plurality of sets of pusher and support rollers mounted on said respective first and second shafts with said pusher rollers being disposed above said support rollers when said shafts are in their horizontal positions; and
- a plurality of strut means disposed behind said respective sets of shafts and projecting on their respective one extremities into the trailing slots of said respective sets to be connected with said respective pivot pins and projecting forwardly to connect on their respective opposite extremities with the free ends of said respective first shafts.

* * * * *